United States Patent [19]

Rallapalli et al.

[11] Patent Number: 4,590,521
[45] Date of Patent: May 20, 1986

[54] PICTURE ELEMENT GENERATOR FOR FACSIMILE RECEIVER

[75] Inventors: Krishna Rallapalli, San Jose; Shinkyo Kaku, Los Gatos, both of Calif.

[73] Assignee: Advanced Micro Devices, Inc., Sunnyvale, Calif.

[21] Appl. No.: 524,957

[22] Filed: Aug. 19, 1983

[51] Int. Cl.$^4$ .............................................. H04N 1/40
[52] U.S. Cl. ...................................... 358/261; 358/294
[58] Field of Search ......................... 358/261, 260, 294

[56] References Cited

U.S. PATENT DOCUMENTS 4,486,784 12/1984 Abraham et al. ..................... 358/261

Primary Examiner—Edward L. Coles, Sr.
Attorney, Agent, or Firm—Patrick T. King; Gary T. Aka

[57] ABSTRACT

A high speed picture element generator for use in a digital facsimile receiver for reforming picture elements from decoded facsimile transmission signals. The picture element generator receives the decoded facsimile signals in the form of run length data of sequential color units in a line of picture. An input register of the picture element generator receives the run length data of a color unit, and an output register holds the picture element data. A decoder, coupled to the input register, generates the picture element data for the output register from the run length data. The decoder is also coupled to the output register so that the generated picture data fills portions of the output register unoccupied by the picture element data of previous color units.

13 Claims, 5 Drawing Figures

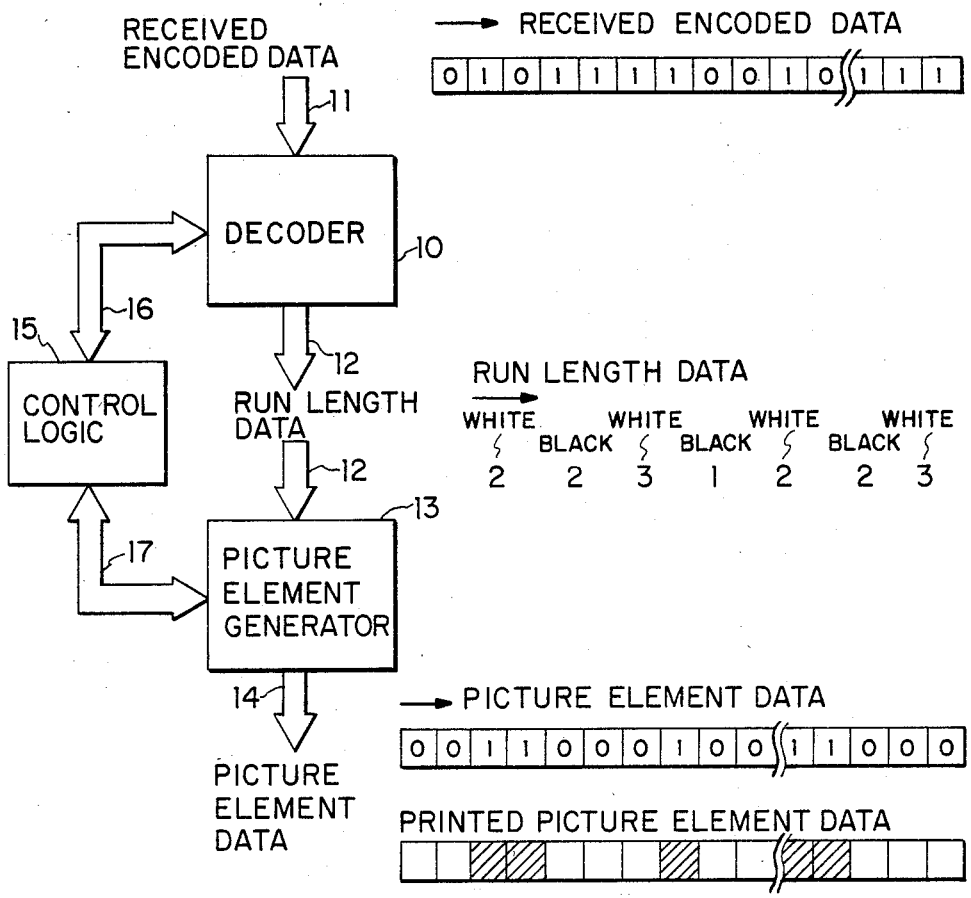
FIG.—1

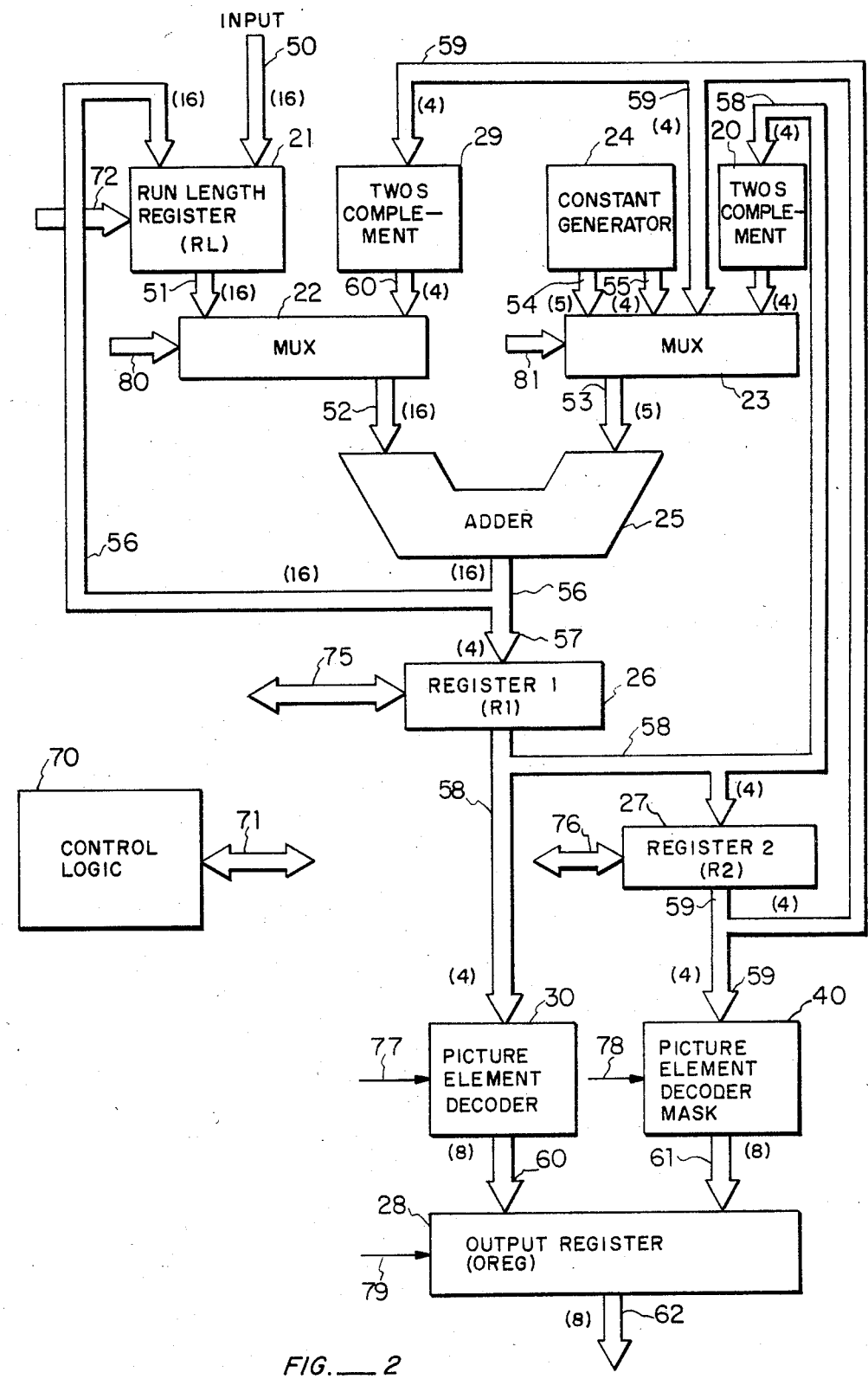
FIG._2

PICTURE ELEMENT GENERATION
FLOW CHART
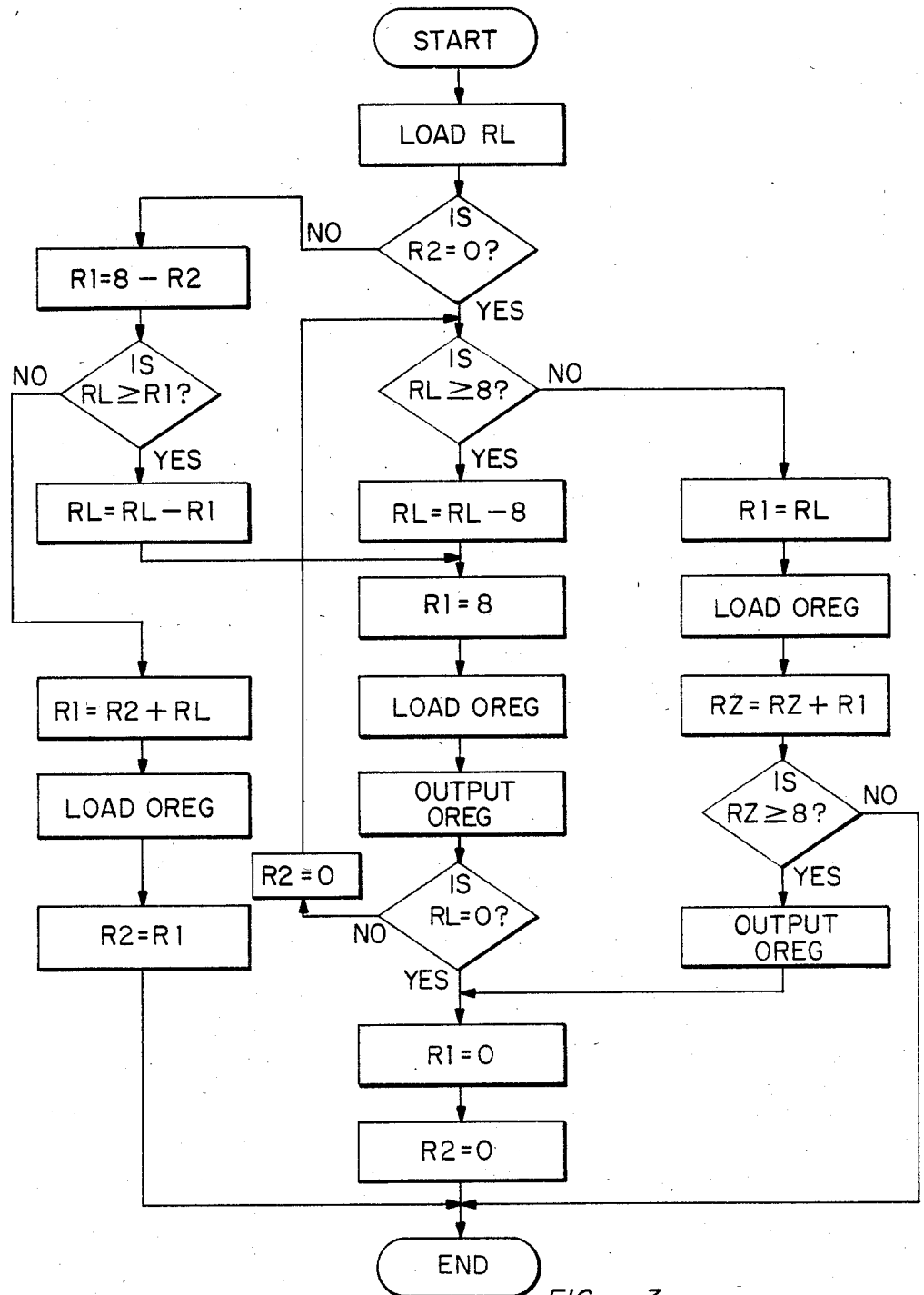
FIG._3

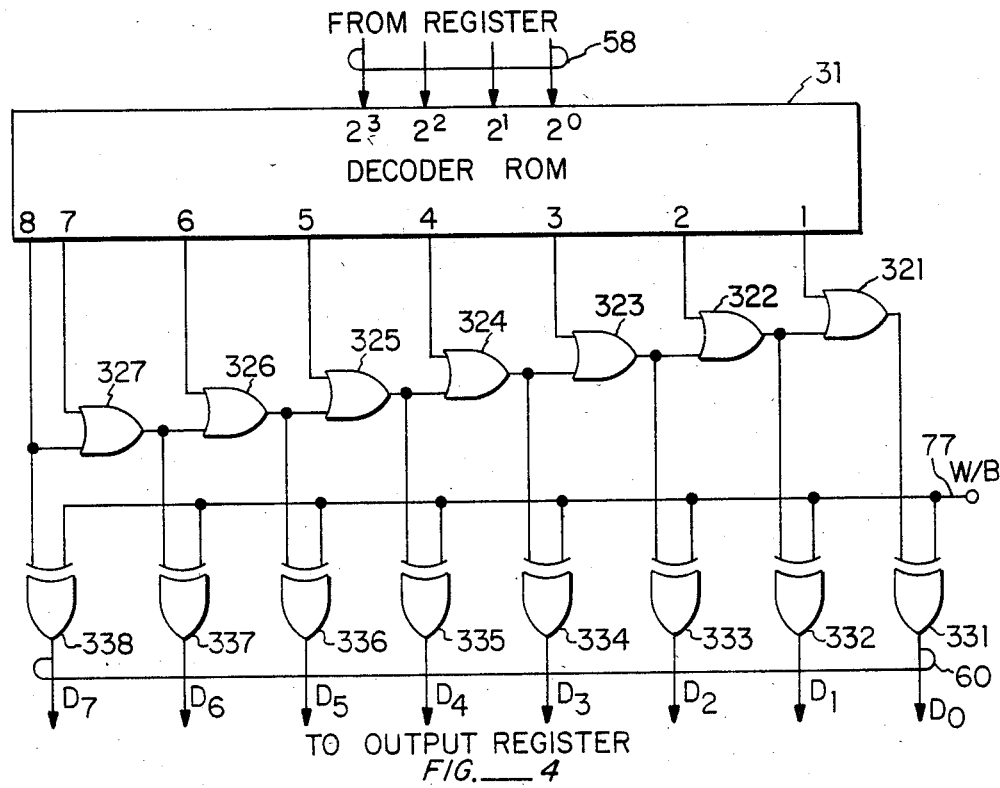
FIG._4
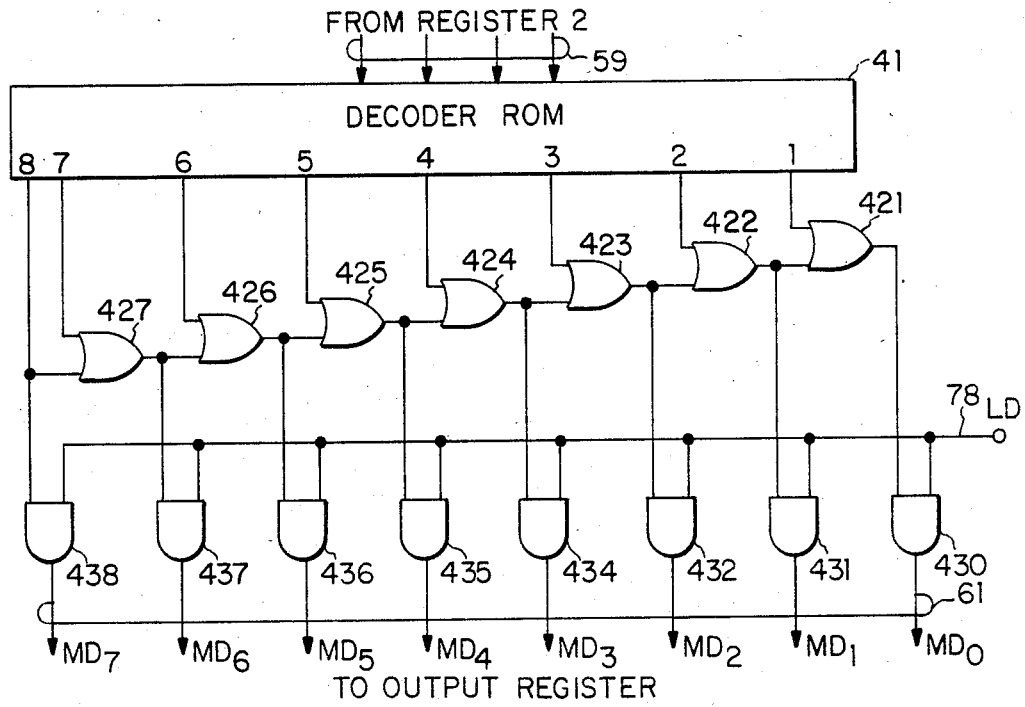
FIG._5

PICTURE ELEMENT GENERATOR FOR FACSIMILE RECEIVER

FIELD OF THE INVENTION

The present invention relates to digital facsimile systems and, more particularly, to a picture element generator for use in a facsimile receiver for reforming the picture elements from decoded facsimile transmission signals.

BACKGROUND OF THE INVENTION

In digital facsimile systems a document is scanned line by line to generate digitized data. Each bit of information, either a "1" or "0", corresponds to a small area on the document. The "color" of the area, i.e., whether the area is white or black, determines whether the associated binary signal is a "0" or a "1", respectively.

These lines of picture data are normally comprised of units of alternating color having various run lengths. For example, a line of picture data might have a white color unit of ten picture elements which represents a blank space in the document. This first color unit has a run length of ten. The next color unit is naturally black and may contain five picture elements for a run length of five. This color unit may represent part of a character on the document. Thus each line of picture data has an alternating sequence of white and black color units, each having a particular run length.

Since the straightforward transmission of this data may involve a large amount of digital information and may therefore consume much time, recent advances in the facsimile field have been made in the encoding of the information so that the amount of data which is required to be transmitted is compressed. These advances include the sequential coding of run lengths, color unit by color unit on a line, and line by line until the entire document is coded. This is called one-dimensional or run length coding. Another approach is the sequential coding of the positions of the first picture element of each color unit in a line to be coded with respect to the positions of the first picture element of color units in a line which has already been coded. This coding procedure, which is repeated line by line, is called two-dimensional coding. For an explanation of digital coding standards, see "International Digital Facsimile Coding Standards," by R. Hunter and A. H. Robinson in the *Proceeding of the IEEE,* Volume 68, No. 7, July 1980, pages 854-867.

The encoded data is transmitted to a distant location, received, and reformed to obtain a copy of the original document. The facsimile receiver has a decoding unit for decoding the compressed data into signals indicating the run lengths of successive color units. These run length signals are fed into a picture element generating unit which transforms the run length signals to picture element signals to reform the original document color unit by color unit and line by line. In an ideal transmission-reception there should be a one-to-one correspondence between the picture elements at the transmission end and the picture elements at the reception end.

The present invention is directed toward a high speed picture element generator. While prior art picture element generators typically form one picture element per clock cycle, the present invention is capable of generating eight picture elements per clock cycle. Generally the present invention generates any number of picture elements in a single color unit at one time, provided that the number is less than eight. With suitable modifications, as discussed below, a picture element generator unit according to this invention can generate even more picture elements per clock cycle. Thus the disclosed device has a significant advantage over devices in the prior art. Additionally, the president invention is suitable for VLSI (very large scale integration) fabrication in a semiconductor device.

SUMMARY OF THE INVENTION

The present invention provides for a facsimile circuit for generating picture element data from sequential color unit run length data comprising first means for receiving and holding the run length data of a first color unit, and a second means for holding the picture element data, the second means operating to release the picture element data as output when the data fills the second means. The facsimile circuit also has a third means for holding run length data indicative of the picture element data in the second means and means coupled to the first and third means for determining what portion of the first color unit may be loaded into the second means, a fourth means coupled to the determining means for holding run length data related to the color unit portion, and means coupled to the fourth and the second means for decoding the fourth register means run length data into picture element data indicative of the color unit portion for loading into the second register means. The first means receives and holds data from the next sequential color unit when the first color unit is completely decoded and loaded as picture element data.

The present invention also provides for a facsimile device for generating picture element data from a sequence of color unit run length data comprising input register means for receiving the run length data of a color unit, output register means for holding picture element data, and decoder means, coupled to the input register means for generating the picture element data for the output register means from the run length data. The decoder means is further coupled to the output register means so that the generated picture data fills portions of the output register unoccupied by picture element data of previous color units. The facsimile device operates so that the picture element data is released from the output register as output data when the output register is filled.

DESCRIPTION OF THE DRAWINGS

A detailed understanding of the present invention may be achieved by a perusal of the following specification and reference to the following drawings:

FIG. 1 is an illustration of a facsimile receiving system with a picture element generating block.

FIG. 2 illustrates the elements and configuration of the present invention.

FIG. 3 is a flow chart by which the picture element generator operates.

FIG. 4 is a diagram of the circuitry of one portion of the picture element generator unit of FIG. 2.

FIG. 5 is a schematic of the circuitry of another part of the decoder unit in FIG. 2, which generates the masking signals which protect the picture element signals already loaded in the output register.

DETAILED DESCRIPTION OF THE INVENTION

A picture element generator, such as that taught by the inventors, fits into a digital facsimile receiving device in the manner shown in FIG. 1. On the right side of FIG. 1 data is represented at the different stages of processing. A facsimile receiver typically has a decoder unit 10 which is coupled to a picture element generator 13 along a path 12. One such decoder unit adapted to process data coded under the international recommendation CCITT T.4 is the patent application, U.S. Ser. No. 524,816, filed of even date by the applicants, entitled *METHOD AND DEVICE FOR TWO-DIMENSIONAL FACSIMILE DECODING.*

The timing and the operation of the decoder unit 10 and the picture element generator 13 is controlled by a control logic unit 15 which communicates with the decoder by a control path 16 and to the picture element generator along a data path 17. The decoder 10 receives the encoded data on a data path 11. This data is in the form of a sequence of "1"'s and "0"'s which correspond to lines of a document which has been scanned by the digital facsimile transmitter. This encoded data is represented by an arbitrary sequence in the uppermost line of data in FIG. 1.

The encoded data signals are accepted by the decoder 10 and transformed into run length data which indicate the color and run length of sequential color units. FIG. 1 shows that first line of data corresponds to a sequence of color units starting on the left with a white color unit of two picture elements, a black unit with two picture elements, a third white color unit with three elements and so forth.

The run length data enters the picture element generator 13 on the data path 12. The generator 13 then forms the picture element data from the run length data. Corresponding to the initial white color unit of two picture elements, the picture element data generates with two ZERO signals. Corresponding to the black color unit of two pictures elements, the picture element generator 13 forms two ONE signals after the picture elements for the first color unit. Then the picture element generator 13 generates three ZEROS corresponding to the third white color unit and so on.

The picture element data is then sent to a printer or other marking device and, with a one for one relationship, sets the picture element data signals down on a copy. The bottommost line illustrates the physical representation of the picture element data signals. By line by line decoding, picture element generation, and printing, a copy of the original document is formed and the facsimile operation performed.

The present invention is directed toward a novel picture element generator. FIG. 2 illustrates a view of the picture element generator, which typically generates several picture element data signals in parallel in a signal clock cycle. This contrasts with the prior art in which a single picture element data signal per clock cycle is generated.

As a point of notation most of the data paths in FIG. 2 have numbers in parentheses in close proximity. These numbers indicate the width or the number of bit lines in the data path.

The picture element generator has a run length register 21 (also labeled "RL" in the drawings), which receives the signals indicating the run length of a particular color unit from a decoder unit. The register 21 has its output terminals connected to a multiplexer 22 by a data path 51. The multiplexer 22 feeds selected data signals, including those from the RL register 21, along a path 52 into an adder 25, which has its results stored in a register 26 (also labeled "R1" in the drawings). The register 26 in turn has its output terminals coupled to a register 27 (also labeled "R2" in the drawings). Both registers 26, 27 have their output terminals coupled to the input terminals of the adder 25 in a feedback fashion. By a data path 58 the register 26 is connected to an input terminal of the adder 25 by a multiplexer 23 through a TWOS COMPLEMENT logic block 20. The register 27 is coupled to both input terminals of the adder 25 by a data path 59, which is connected to the multiplexer 23 and is also to a TWOS COMPLEMENT logic block 29 coupled to the input terminals of the multiplexer 22. The TWOS COMPLEMENT logic 29 operates with the adder 25 to permit the performance of a subtraction function.

The multiplexer 23 also connects a constant generator block 24, which generates binary signals having the value −8 and +8 to the adder 25. The multiplexer 23 may select these values by the data paths 54 and 55 respectively.

The operational results of the adder 25 are also connected in a feedback fashion to the run length register 21 by a data path 56.

The registers 26, 27 have their output terminals connected to a decoder block shown in FIG. 2 as two separate decoder elements 30 and 40. One separate picture element decoder element 30 is connected to the output terminals of the register 26 by the data path 58 and the other picture element decoder element 40 is connected to the output terminals of the register 27 by the data path 59. Both elements 30, 40 are connected to an output register 28 (also labeled "OREG" in the drawings) by the data paths 60, 61 respectively.

The timing and operation of the various elements are controlled by a control logic block 70 through the control lines 72–79. The control lines 72–79 denote the specific lines to the respective element in FIG. 2, while the control lines 71 represents all of the control lines going into and leaving the control logic block 70.

The elements as shown in FIG. 2 operate so that the run length register 21 receives the signals which indicate the run length of a particular color unit for which picture element data must be generated. From the register 21 the R1 register 26 accepts signals indicating the run length of the maximum portion of the color unit which may be fitted into the output register 28. On the other hand, the R2 register 27 holds the signals for the accumulated run length of the picture element data which have already been loaded into the output register 28. The picture element decoder 30 and the picture element decoder mask 40 cooperate so that the picture elements already loaded into the output register 28 are protected or masked from the picture element data generated by the decoder 30 and loaded into the register 28.

To determine what portion of a color unit may be loaded into the output register 28, the picture element generator operates in accordance with the flow chart illustrated in FIG. 3. The operation depends upon the status of registers, such as RL and R2, for the election of operation branches. The particular logic circuits are not shown, since it is well known how to design and connect such circuits to these registers and the control logic for the operation of picture element generator, as described below.

The operation starts with the loading of the run length signals of a color unit into the run length register 21 on path 50. Then a determination is made as to whether register 27 is empty or not. If the register 27 is empty, then the operation stays in the central branch of the flow chart.

A second decision must be made as to whether the run length of the color unit is greater than eight. If the run length is greater than eight, the next operation in the central branch must be performed. The contents of the run length register 26 is reloaded by subtracting eight from the original run length color unit and reloading the results into the register 21. This subtraction operation is carried out by the adder 25 with the operands from the run length register 21 and the constant generator block 24. The result is carried by the path 56 to the RL register 21. The R1 register 26 is set to a value of eight, which signals pass to the picture element decoder 30. The picture element data generated by the decoder 28 is loaded into the output register 28. Subsequently the data in the output register 28 is released by the path 62.

The next operation determines whether the color unit has been completely decoded, i.e., whether the run length register 21 is zero or not. If it is not, the R2 register 27 is reset to zero and the machine returns to determine whether the remaining run length in the RL register 21 is equal to or greater than eight.

If the remaining run length is not equal to or greater than eight, then the operation moves to the branch on the right side of the FIG. 3 flow chart. In this case the run length of a color unit held by the run length register 21 is less than eight and the R1 register 26 is set equal to the run length contained in the RL register 21. The run length signals in the RL register 21 pass through the multiplexer 22 and adder 25 to the R1 register 26. The run length is then decoded by the picture element decoder unit 30 and loaded by the data path 60 into the output register 28.

Subsequently the R2 register 27 is updated to contain the total run length of all run length portions loaded into the OREG register 28. This task is performed by adding the previous value contained in the R2 register 27 to the value contained in the R1 register 26 and storing the value in the R2 register 27. This function is performed by moving the signals in the register 26 by the path 58 into the multiplexer 23 and by the path 53 into one input terminal of the adder 25. Meanwhile the signals of the register 27 are fed back into the other input terminal of the adder 25 by the path 59 through the TWOS COMPLEMENT block, the multiplexer 23 and the path 52. For this operation the TWOS COMPLEMENT block does not function to permit the signals to pass unchanged.

After this updating of the R2 register 27, a determination is made whether the OREG register 28 is full or not, by determining whether the value in R2 register 27 is equal to or greater than eight, the number of bit positions in the output register 28. If the answer is affirmative, then the contents of the output register 28 are released as output data and the flow chart returns to the central branch. The two registers 26, 27 are cleared and the operation starts over again by loading the run length register 21 with the run length signals of the next color unit. If the output register 28 is not completely full, then operation returns directly to the starting point.

The central branch of the flow chart also will return to the starting point if the determination is that the run length register 21 is zero after eight bits had been loaded into the output register 28, as discussed previously. If the run length register is empty, implying that the run length of the color unit is a multiple of eight, then the central branch steps were sufficient to exhaust the run length. The registers 26, 27 are cleared and the next color unit run length unit is loaded into the RL register 21.

The left branch of the flow chart in FIG. 3 illustrates the operation of the invention when the OREG register 28 is partially loaded and the run length signals of a new color unit are loaded into the RL register 21. In that case, the R1 register 26 is loaded with the space available in the OREG register 28 by subtracting the value in the R2 register 27 from eight, the total capacity of the output register 28, and storing the results in R1 register 26. The value eight is fed from the constant generator unit 24 through the multiplexer 23 and path 53 into the adder 25. The subtrahend from the R2 register 27 passes along the data path 59 through the TWOS COMPLEMENT block 29 and the data path 60 to the multiplexer 22 and data path 52 into the adder 25. The results are stored in the R1 register 26.

Then a determination is made whether the run length of the color unit held in the RL register 21 is greater than the amount of space available in the output register 28. If it is, then the RL register 21 is reset to contain the difference between the original run length of the register 21 and the space available in the OREG register 28. The RL register 21 operand is selected by the multiplexer 22 and the multiplexer 23 selects the input signals from the TWOS COMPLEMENT block 20 for the R1 register 26 operand. The results from the adder 25 are stored in the register 21 by the path 56. The operation returns to the central branch and the R1 register 26 is set to eight, implying that the run length of the color unit held in the RL register 21 was large enough to completely fill the output register 28. The picture elements are generated and loaded into the output register 28 and released as output. Subsequently a determination is made as to whether the run length register 21 is empty or not, i.e., whether the color unit has been completely transformed into picture element data.

If the run length in register 21 is not greater nor equal to the space available in the OREG register 28, then the operation remains in the left hand branch of the flow chart. The contents of the R1 register 26 are updated to include the run length of the incoming color unit and the accumulated run lengths of color units already in the register 28. The contents of the R2 register 27 and the contents of the RL register 21 are added; the results are stored in the R1 register 26. After that is performed, the output register 28 is loaded with the picture elements generated from the decoder 30 and with the masking operation of the mask unit 40. The next step in the operation is that the run length contained in the R2 register 27 is updated by moving the contents of the R1 register 26 to the R2 register 27 that the R2 register 27 will hold accumulated run length of all picture elements now loaded into the OREG register 28. The operation returns to start all over again.

An example illustrates the operation described above. Assume that the run length register 21 is loaded with signals for a white color unit of twenty picture elements. Since this is the first color unit, the R2 register 27 is zero. The contents of the R1 register 21 are greater than eight so the operations remain in the center branch of the flow chart. The run length register 21 is set to twelve (20 minus 8) and eight is loaded into the R1 register 26. This is decoded by the element 30 and eight picture elements are loaded into the output register 28 and sent as output data. Since the R1 register 21 is not zero, a loop is performed with the central branch by which the run length register 21 is set to four (12 minus 8) and another eight picture elements sent out as picture elements. The central branch loop is followed back again. However, this time since the RL register 21 is not equal to or greater than eight, the operation enters into the right hand branch. The value four is loaded into the R1 register 26 which is decoded by the element 30 and the R2 register 27 which had been equal to zero is set equal to four. Since R2 register 27 is not equal to nor greater than eight, the operation returns to the beginning and the next color unit is loaded into the run length register 21.

Assuming that the next color unit is black with a length of two, the operation will enter to the left hand branch of the flow chart. Since R1 register 26 is set equal to four, the number of remaining spaces in the output register, the next step yields a decision that the run length in the RL register 21 does not fill the remaining spaces in the output register 28. The R1 register 26 is set equal to six, the sum of the run length of the picture elements already loaded into the OREG register 28 and the run length of the color unit now into consideration. Through the operation of the picture element decoder 30 and the decoder mask 40 two black picture elements are loaded into the output register 28 and the R2 register 27 is updated to contain the value six, the number of picture elements now loaded into the output register 28.

The operation continues by loading a third, white color unit. Assuming this color unit has a run length of three, the operation once again returns to the left hand branch of the flow chart. The R1 register 26 has a value of two (8 minus 6), indicating that two spaces are left in the output register 28. Since the run length contained in the RL register 21 is greater than two, the run length register 21 is reset to one (3 minus 2). The operation returns to the center branch of the flow chart. The register 26 is set to eight, indicating that the output register is completely filled. The decoder 30 and the mask 40 operate so that two white color units are loaded into the output register 28 and released through the data path 62. Since the run length in RL register 21 is still not empty, the R@ register 27 is reset to zero and the single remaining white color unit in the RL register 21 is decoded and loaded into the output register 28 and the process continues.

FIG. 4 shows the circuit used as the picture element decoder 30. The decoder unit 30 receives the run length signals on the data path 58 with a decoder ROM 31. The ROM 31 is set so that the four binary signals on the bit lines of the data path 58 are decoded to a single output signal corresponding to the value at the input. For example, for a signal of "0101," or a value of 5 in decimal, the ROM 31 generates a signal of ONE at the output corresponding to and denoted by the number "5," while all the other outputs are zero.

The logic gates 321-327 and the EXCLUSIVE OR gates 331-338 operate so that two groups of continuous ONES and continuous ZEROS are formed on the output lines $D_0$-$D_7$, which form the data path 60. If the signals on the path 58 corresponds to a white color unit at run length five, a "1" signal appears on the control line 77 from the control logic 70. The control line 77 is "0" for black color units. Since all of the OR gates 321-325 have "1" output signals resulting from the "1" signal on the "5" output terminal of the ROM 31, the EXCLUSIVE OR gates 331-335 have "0" output signals. The EXCLUSIVE OR gates 336-338, on the other hand, generate "1" output signals.

The picture element decoder mask 40 is illustrated in detail in FIG. 5. The unit 40 receives binary input signals along the data path 59 from the R2 register 27, which contains the accumulated run length of the picture element data already in the output register 28. The mask 40 operates in a fashion similar to that of the decoder 30. For an input of five, "0101" in binary, the decoder ROM 41 operates exactly like the ROM 31. The OR logic gates 421-427 and the AND gates 431-438 are coupled in a manner that the outputs of the AND gates 431-435, are ZERO and the output from the AND gates 436-438 are ONE when the control line 78 has a "1" signal on it. This control signal occurs at the time picture element signals are loaded into the OREG register 28 from the decoder 30. The output lines of the mask 40 are connected to the output register 28 in parallel with the output lines $D_0$-$D_7$. A "1" signal on the output line $MD_0$ enables the signal on the output line $D_0$ to be loaded into the output register 28. A zero signal on any of the output lines $MD_0$-$MD_7$ prevents the corresponding signal on the decoder output lines $D_0$-$D_7$ from being loaded into the output register 28.

Thus, in the example given above, for the white color unit having a run length of twenty, the R2 register 27 has a value of zero in the first two cycles. The mask 40 has a signal of "1" on all of its lines $MD_0$-$MD_7$. At the same time the decoder 30 receives a "1" signal on its control line 77. In the first two cycles the R1 register 26 contains the signals "1000," eight in decimal, to generate a ZERO on all its output lines $D_0$-$D_7$. Thus "00000000" is loaded into the output register 28 and released. The same is true in the second cycle. In the third cycle for the first color unit a value of four is held in the R1 register 26 which causes the generation of a signal "11110000" as the output for the decoder 30. Since the R2 register 27 is zero at this time, the mask 40 generates a signal of all ONES on its output path 61. Thus the register 28 will hold a value "11110000."

The second color unit, being black with a run length of two, creates a value of six, "0110," in the R1 register 26. Correspondingly the decoder will generate signals "00111111," since the control line 77 is "0" to indicate a black color unit. At the same time the R2 register 27 contains a value of four and the mask 40 generates a signal of "11110000" enabling only half of the output register 28 to receive the input signals from the decoder 30. The result in the output register 28 is thus "00110000."

Subsequently the third color unit having a run length of three in white is loaded into the register 21. By the FIG. 3 flow chart explained above the R1 register 26 has a value of eight. The R2 register 27 has a value of six. Responsive to the value eight in the R1 register 26 and a "0" on the control line 77, the decoder 30 generates the signals "11111111." The mask 40 responsive to the value six held in the R2 register 27 generates a value "11000000". This permits only the signals for the lines $D_6$ and $D_7$ to be loaded into the output register 28. The contents of the OREG register 28 are thus "00110000" representing from right to left the picture elements of the last part of the first white color unit, the second black color unit and two-thirds of the third color unit. These signals then are released as output signals by the output register 28.

Although the foregoing invention has been described with respect to a particular embodiment, this embodiment is not intended to limit the invention, but rather to clarify and explain it. The scope of the invention is to be determined from the appended claims.

We claim:

1. A facsimile circuit for generating picture element data from sequential color unit run length data comprising first register means for receiving and holding said run length data of a first color unit, second register means for holding said picture element data, said second register means releasing said picture element data as output when said data completely fills said register means, third register means for holding run length data indicative of the picture element data in said second register means, means coupled to said first and third register means for determining what portion of said first color unit may be loaded into said second register means, fourth register means coupled to said determining means for holding run length data related to said color unit portion, and means coupled to said fourth and second register means for decoding said fourth register means run length data into picture element data indicative of said color unit portion for loading into said second register means, said first register means receiving and holding run length data of the next sequential color unit when said first color unit is completely decoded and loaded as picture element data.

2. The facsimile circuit as in claim 1 wherein said fourth register means run length data are the sum of the third register means run length data and run length data corresponding to the run length of said color unit portion.

3. The facsimile circuit as in claim 2 wherein said decoding means is coupled to said third register means, said decoding means generating a mask corresponding to said third register means run length signals so that said picture element data already in second register means are unaffected when said fourth register means decoded picture element data are loaded into said second register means.

4. A facsimile device for generating picture element data from a sequence of color unit run length data comprising input register means for receiving run length data of a color unit, output register means for holding picture element data, and decoder means, coupled to said input register means, for generating in parallel a plurality of said picture element data for said output register means from said run length data, said decoder means further coupled to said output register means so that said generated picture data fills portions of said output register unoccupied by picture element data of previous color units.

5. The facsimile device as in claim 4 wherein said decoder means comprises first register means for holding the run length data of a portion of said color unit, said run length portion corresponding to said picture element data to be loaded into said output register, and second register means holding the accumulated run length of data already loaded into said output register so that said picture element data corresponding to said run length portion is loaded into unoccupied portions of said output register.

6. The facsimile device as in claim 5 further comprising means coupled to said input, first and second register means for determining the largest portion of said color unit for said first register means consistent with said unoccupied portions of said output register.

7. The facsimile device as in claim 6 wherein said decoder means further comprises a first decoder element coupled to said first register means for generating picture element data corresponding to said color unit portion, and coupled to said output register for loading said picture element data therein; and a second decoder element coupled to said first register means for generating picture element data indicative of said accumulated run length, and coupled to said output register in such a manner that said second decoder picture element data masks said first decoder picture element data so that unoccupied portions of said output register are filled.

8. The facsimile device as in claim 7 wherein said input register holds the remaining run length data for a color unit having a portion thereof decoded and loaded into said output register, said remaining run length data to be decoded and loaded subsequently.

9. In a facsimile device for processing lines of picture data having a decoder unit for transforming coded picture data signals into signals indicative of the run length of color units in said picture data, a picture element generating unit for transforming said run length signals into picture element signals, and a control logic unit for controlling the operations and timing of operations in said decoder unit and said picture element generating unit, said picture element generating unit comprising an input register coupled to said decoder unit for receiving and holding run length signals of a first color unit responsive to said control signals, an output register for holding transformed picture element signals and releasing said picture element signals responsive to said control signals, a first register for holding signals indicative of the accumulated run length of picture element signals held in said output register, an adder coupled to said input register and said first register for determining the largest portion of said first color unit to be fitted into the unfilled portion of said output register, said adder generating run length signals related to said color unit portion responsive to control signals, a second register, coupled to said adder for holding said generated run length signals, and a decoder element coupled to said second register for transforming said generated run length signals into picture element signals related to said color unit portion, whereby, responsive to control signals, said output register releases said picture element signals when said output register is full, and said input register receives holds run length signals of the next color unit when said first color unit portion is completely transformed.

10. The device as in claim 9 wherein said generated run length signals indicate the sum of the run length of said color unit portion and the accumulated run length of picture element signals held in said output register.

11. The device as in claim 10 wherein said decoder element generates in parallel a first set of two groups of all ONES and all ZEROS, the number of ONES and ZEROS determined by the run length indicated by said generated run length signals in said second register.

12. The device as in claim 11 wherein said decoder element is further coupled to said first register, and said decoder unit generates in parallel a second set of two groups of all ONES and all ZEROS, the number of ONES and ZEROS in said set determined by the accumulated run length indicated by first register signals, said first and second sets being logically combined so that said first set ONES and ZEROS are cancelled at bit positions in said output register occupied by said picture element signals and said first set ONES and ZEROS are loaded into bit positions in output register unoccupied by picture element signals to form new picture element signals related to said color unit portion.

13. The device as in claim 12 wherein one of said two groups of all ONES and all ZEROS in said first set has the number of ONES or ZEROS equal to the run length indicated by said generated run length signals, the selection of the ONES group or ZEROS group determined by a control signal indicating the color of said color unit.

* * * * *